(12) United States Patent
Newton (10) Patent No.: US 10,530,852 B2
(45) Date of Patent: Jan. 7, 2020

(54) NETWORK MAPPING IN CONTENT DELIVERY NETWORK

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 58 days.

(21) Appl. No.: 15/158,877

(22) Filed: May 19, 2016

(65) Prior Publication Data

US 2017/0339222 A1    Nov. 23, 2017

(51) Int. Cl.
*G06F 15/173*    (2006.01)
*H04L 29/08*    (2006.01)
*H04L 29/12*    (2006.01)

(52) U.S. Cl.
CPC ...... *H04L 67/1036* (2013.01); *H04L 61/1511* (2013.01); *H04L 67/1044* (2013.01); *H04L 67/1097* (2013.01); *H04L 67/2842* (2013.01); *H04L 67/2866* (2013.01); *H04L 67/32* (2013.01); *H04L 67/1023* (2013.01); *H04L 67/1029* (2013.01)

(58) Field of Classification Search
CPC ........................ H04L 67/1036; H04L 67/1044
USPC ................................................. 709/203, 223
See application file for complete search history.

(56) References Cited

U.S. PATENT DOCUMENTS

| 7,574,499 | B1 * | 8/2009 | Swildens ................ G06F 9/505 |
| | | | 709/202 |
| 8,489,724 | B2 | 7/2013 | Ghosh |
| 8,756,341 | B1 * | 6/2014 | Richardson ......... H04L 67/2814 |
| | | | 709/245 |
| 2002/0078237 | A1 * | 6/2002 | Leighton ........... H04L 29/12066 |
| | | | 709/239 |
| 2004/0249939 | A1 | 12/2004 | Amini et al. |
| 2008/0147866 | A1 | 6/2008 | Stolorz et al. |
| 2010/0088405 | A1 | 4/2010 | Huang |
| 2012/0066360 | A1 * | 3/2012 | Ghosh ................ H04L 43/0864 |
| | | | 709/223 |

(Continued)

OTHER PUBLICATIONS

International Search Report dated Aug. 11, 2017, Int'l Appl. No. PCT/US17/33581, Int'l Filing Date May 19, 2017; 3 pgs.

(Continued)

*Primary Examiner* — Duyen M Doan (57) ABSTRACT

A computer-implemented method in a content delivery network (CDN) having multiple delivery servers. The CDN delivers content on behalf of at least one content provider. Distinct delivery servers are logically grouped into delivery server groups. One or more CDN name servers are associated with some of the delivery server groups. Network map data are determined using network data determined by the CDN name servers associated with at least some of the deliver server groups. The network data with respect to a CDN name server relative to a resolver is based on an estimated popularity of that CDN name server for that resolver. Responsive to a client request, including a hostname associated with a content provider, at least one CDN name server determines, using network map data, at least one delivery server to process the client request.

16 Claims, 4 Drawing Sheets

(56) References Cited

U.S. PATENT DOCUMENTS

| | | | |
|---|---|---|---|
| 2012/0198043 A1* | 8/2012 | Hesketh | H04L 29/1265 |
| | | | 709/223 |
| 2013/0173769 A1 | 7/2013 | Seastrom et al. | |
| 2014/0289319 A1* | 9/2014 | Richardson | H04L 67/2814 |
| | | | 709/203 |
| 2014/0297870 A1* | 10/2014 | Eggleston | H04L 61/1511 |
| | | | 709/226 |
| 2015/0098333 A1 | 4/2015 | Lin et al. | |
| 2015/0207695 A1 | 7/2015 | Varney et al. | |
| 2016/0014082 A1 | 1/2016 | Bharali | |
| 2016/0087931 A1* | 3/2016 | Kim | H04L 61/1511 |
| | | | 709/203 |
| 2016/0094471 A1* | 3/2016 | Newton | H04L 67/2842 |
| | | | 709/226 |
| 2016/0119279 A1* | 4/2016 | Maslak | H04L 61/1511 |
| | | | 709/223 |

OTHER PUBLICATIONS

Written Opinion of the International Searching Authority dated Aug. 11, 2017, Int'l Appl. No. PCT/US17/33581, Int'l Filing Date May 19, 2017; 7 pgs.

International Preliminary Report on Patentability, dated Nov. 20, 2018, Int'l Appl. No. PCT/US17/033581, Int'l Filing Date May 19, 2017; 9 pgs.

Extended European Search Report, dated Oct. 24, 2019, Application No. 17800255.6, filed May 19, 2017; 8 pgs.

* cited by examiner

FIG. 4

NETWORK MAPPING IN CONTENT DELIVERY NETWORK

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

Field of the Invention

This invention relates to content delivery and content delivery networks. More specifically, this invention relates to determining device connectivity and network mapping in content delivery networks.

BRIEF DESCRIPTION OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CDN means content delivery network;
CNAME means Canonical Name;
DNS means Domain Name System;
HTTP means Hyper Text Transfer Protocol;
HTTPS means HTTP Secure;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
TTL means time to live;
URI means Uniform Resource Identifier; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers. Clients of a CDN benefit by being able to obtain content with fewer delays.

Exemplary CDNs are described in U.S. Pat. Nos. 8,060,613 and 8,825,830.

Figure 1:
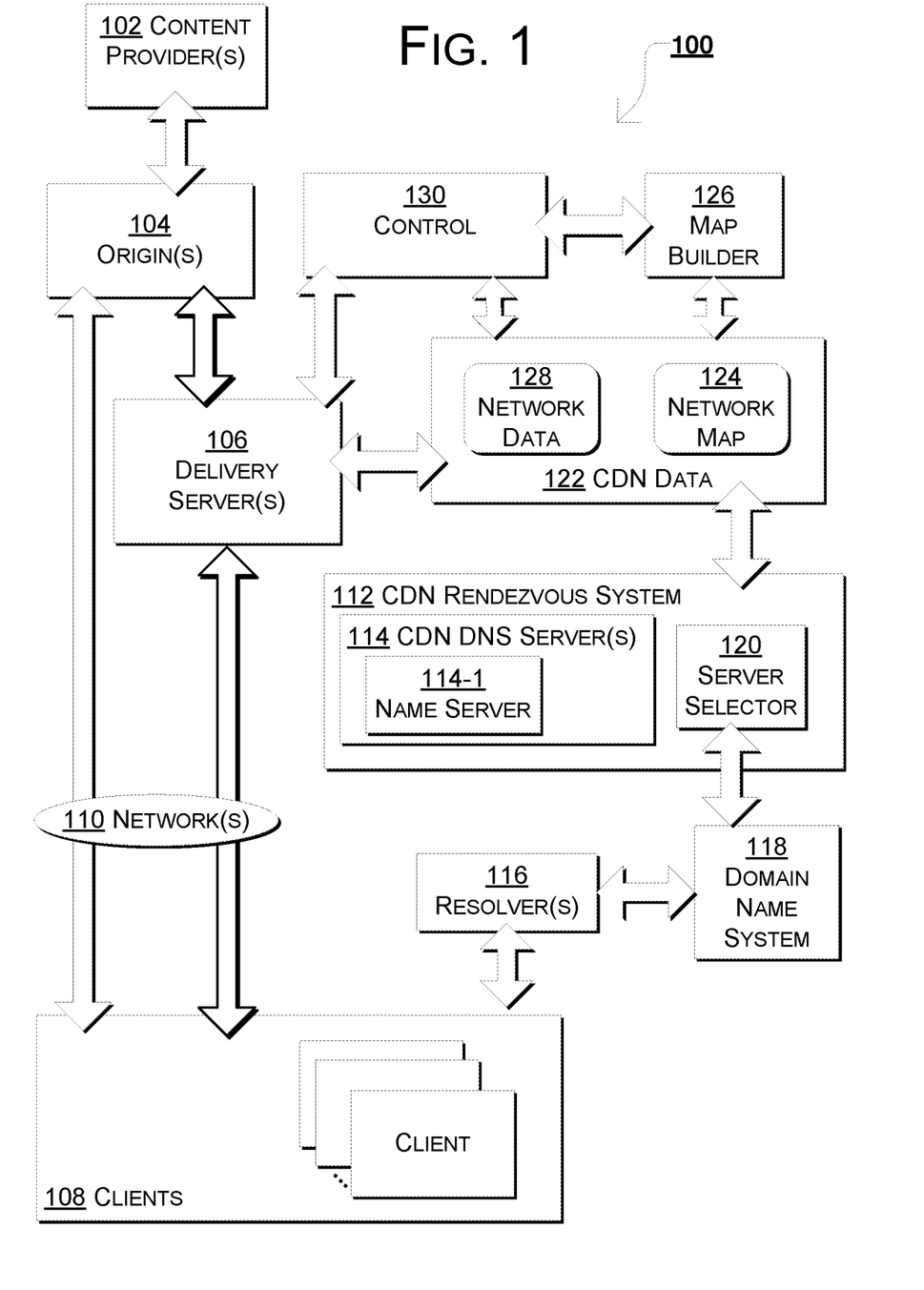
FIGS. 1-3 depict aspects of a content delivery network (CDN) according to exemplary embodiments hereof.

FIG. 1 shows aspects of an exemplary CDN 100 in which one or more content providers 102 provide content via one or more origin sources 104 and/or delivery services (servers) 106 to clients 108 via one or more networks 110. The delivery services (servers) 106 may form a delivery network from which clients may obtain content. The delivery services 106 may be logically and/or physically hierarchically organized and may include edge caches. The network(s) 110 may include networks such as Local Area Networks (LANs), Wide Area Network (WANs), and other CDNs, and typically comprise the Internet.

Content (e.g., resources associated with a property of a content provider) may be cached at various locations within the CDN, e.g., at nodes in a delivery network formed by the various delivery services of the CDN. Content may be cached, e.g., when it is served from the CDN.

In operation, when a client 108 requests one or more resources (e.g., content) from the CDN, the client is preferably directed to an appropriate server (or servers) to deal with the client's request. An appropriate server is preferably one which is not too heavily loaded and which is not too far from the client in terms of some measure of network distance.

A CDN uses a so-called rendezvous mechanism or system 112 to direct client requests to appropriate servers to deal with those requests. A rendezvous system 112 may include one or more DNS name servers 114. The rendezvous system 112 may also use or comprise a server selector mechanism 120 to associate server(s) with client requests, as discussed below. The selector mechanism 120 may be or may not be integrated into the DNS name server(s) 114.

In operation, a client 108 requests content using a URI (a URL or the like). A formal URL description is given in RFC 1738, "Uniform Resource Locators (URL)," and URIs are described in Network Working Group RFC 2396, "Uniform Resource Identifiers (URI): Generic Syntax," August, 1998, the entire contents of both of which are fully incorporated herein for all purposes.

A URL includes a domain (or hostname) identifying one or more locations from which the content may be obtained. The client attempts to resolve that domain or hostname into a network address—typically an IP address—and then uses that network address to connect to a service and to request the content specified in the URL, using whatever protocol was specified in the URL.

A resolver 116 associated with client 108 uses a domain name system (DNS) 118 to resolve the hostname to a network address. As is well known, a resolver is a mechanism (e.g., a program) that resolves questions about names by sending those questions to appropriate servers and responding appropriately to the servers' replies. In the most common application, a web browser uses a local stub resolver library on the same computer to look up names in the DNS. That stub resolver is part of the operating system. The stub resolver usually will forward queries to a caching resolver, a server or group of servers on the network dedicated to DNS services. Those resolvers will send queries to one or multiple authoritative servers in order to find the IP address for that DNS name.

Thus, when content specified in a URL is being served by a CDN, the DNS 118 (e.g., name servers in the DNS 118) may direct requests associated with that URL (or with the domain or hostname in that URL) to the CDN rendezvous system 112 for further resolution. This direction (from the "public" DNS 118 to the CDN rendezvous system 112) may be achieved, e.g., using CNAMEs or the like. The CDN rendezvous system 112 (including one or more DNS name servers 114 associated therewith) preferably uses a "best" or "optimal" server selection mechanism 120 to determine an appropriate (e.g., a "best" or "optimal") server to which to direct each particular client request.

The server selection mechanism 120 may be logically considered part of the rendezvous system 112, and may be fully or partially incorporated into the CDN DNS name server(s) 114.

As should be appreciated, there may be more than one appropriate server for any particular client request, and an appropriate server preferably provides requested resources to the client faster and/or cheaper than those resources would have been provided from another server.

An exemplary server selection algorithm is described in U.S. Pat. No. 6,185,598, the entire contents of which are fully incorporated herein by reference for all purposes.

To direct client requests appropriately (to an appropriate server or servers), the server selection mechanism 120 may use various CDN data 122 relating to aspects of the state of the network and devices in the network. In particular, the CDN data 122 used by the server selection mechanism 120 may include a network map 124 (e.g., a link-cost map) that approximates a current (or recent) state of the network (including the CDN and the clients). The network map 124 preferably includes a cost (e.g., in terms of connectivity time) between nodes in the network. These costs and other data in the network map 124 may be used to determine an appropriate server for a request from a particular client 108. The term "cost" refers to any factor, including speed, bandwidth, load, etc., that may affect the quality of content delivery to a client. For example, if a client can obtain the same content from multiple locations, an "optimal" location may be the one that can get that content to the client the quickest.

Components of the CDN rendezvous system 112 (including the server selector 120) may query a copy of the network map 124 and/or may maintain local copies of the network map 124.

Networks such as the Internet are constantly changing with respect both to topology (as nodes join and leave) and cost (as nodes or paths become more or less loaded and/or expensive), and the network map 124 needs to be repeatedly and regularly updated to reflect changes (cost and connectivity) in the network. In a presently preferred implementation the network map is re-calculated and updated at least hourly.

A map builder mechanism 126 may be used to build and maintain aspects of the network map 124. The CDN data 122 preferably include network data 128, and the map builder 126 may build aspects of the network map 124 using those network data 128. The network data 128 may include information about network connectivity, including costs associated with nodes in the network.

A control mechanism 130 may control aspects of data collection (for CDN data 122, including network data 128) and network map building.

For the delivery of content to a client via the CDN, it is important to know a cost of getting from each CDN delivery server to the client. However, in a large and dynamic network such as the Internet it is not possible to know every potential client or even the location of every potential client, and so a client's (or potential client's) location is generally approximated to a known location that is presumed to be near (in network terms) to the client. For example, in some cases a client may be assumed to be located at or near its ISP (Internet Service Provider).

Figure 2:
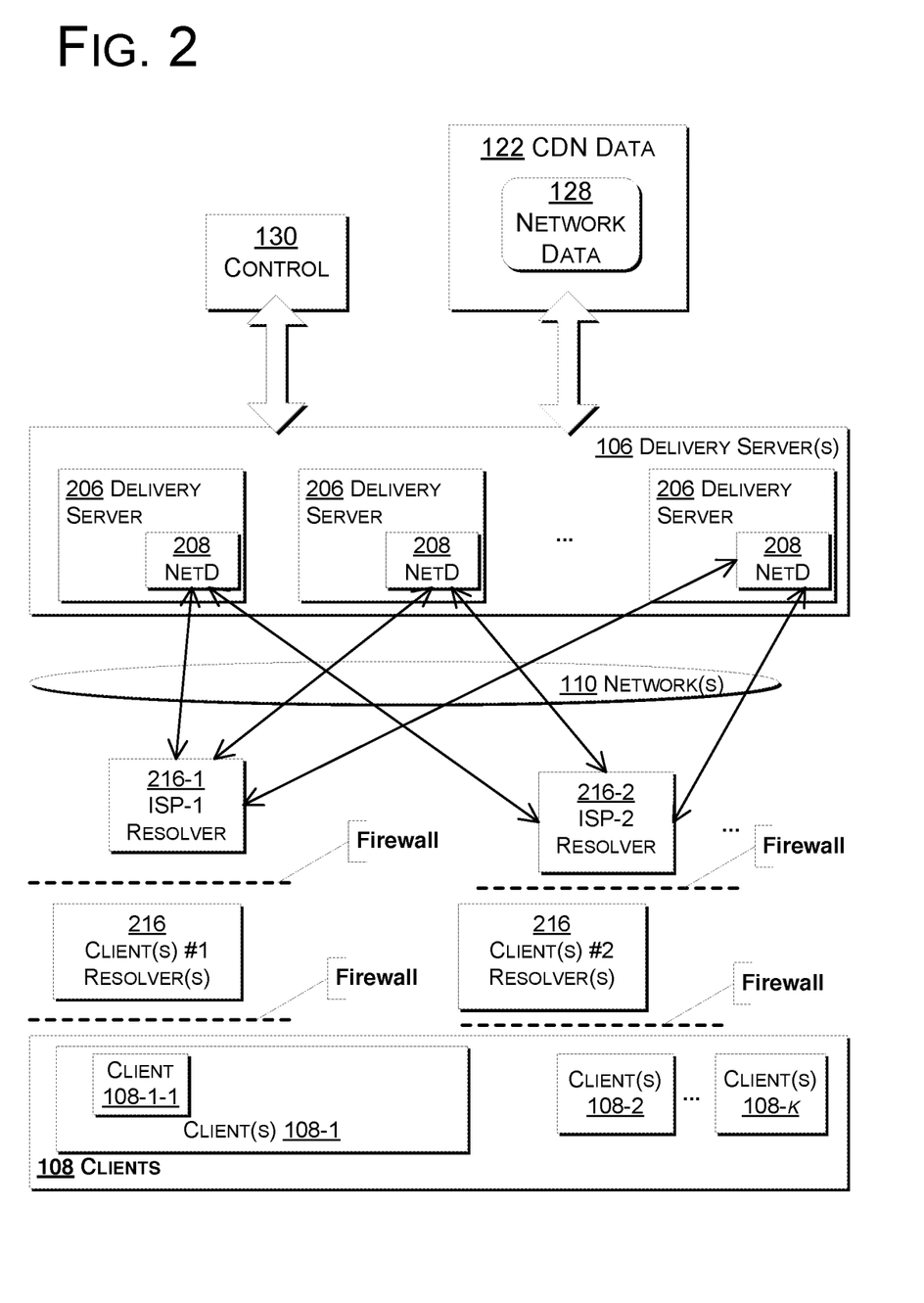

Aspects of collecting information about the network are discussed with reference to FIG. 2, which shows aspects of the framework of FIG. 1.

The CDN may measure network connectivity (to build up a network connectivity/cost map) using network data collected, at least in part, by the delivery servers 106. The delivery servers 106 may be grouped into clusters or the like. A cluster preferably corresponds to a physical collection of co-located servers, and may comprise, e.g., all the servers in a particular rack. At least one server 206 in each cluster (or rack) runs an agent/mechanism (referred to herein as netd agent mechanism 208). The various netd agent mechanisms 208 test and measure network connectivity from the servers on which they run to various known locations in the network. The netd agent mechanisms 208 may use known procedures such as ping, traceroute, etc., to obtain measurements (e.g., round-trip time) to these various known locations.

The netd agent mechanisms 208 preferably run regularly and continuously, providing constant and substantially real-time information to the network data 128. In preferred implementations, each netd agent mechanism 208 operates when instructed, e.g., by the controller 130 or the like. The controller 130 may instruct some or all of the netd agent mechanisms 208 to update their information at regular intervals, e.g., in time for the map builder 126 to update the network map. In a presently preferred implementation the netd agent mechanisms 208 are instructed by controller 130 to run about every 5 minutes. The netd agent mechanisms 208 provide their measurement results to the network data 128 for use, e.g., by the map builder 126.

The controller 130 may use a list (e.g., a ping target list) to tell the netd agent mechanisms 208 which targets to measure ("ping").

For the purposes of building the network connectivity and cost map 124, servers 106 in a particular cluster or rack are considered "measurement equivalent," and thus the netd agent mechanism 208 need only run on one server per cluster or rack.

Data measured and/or collected by the netd 208 programs may be provided as network data 128 to the CDN and may be used by the map builder 126 to build or maintain network map 124.

As explained, however, the netd agent mechanisms 208 running on the various servers 106 may not be able to determine network connectivity about actual clients 108.

Clients 108 are typically associated with one or more so-called Internet Service Providers (ISPs). For example, as shown in FIG. 2, clients 108-1 are associated with ISP-1, clients 108-2 with ISP-2 . . . clients 108-*k* with ISP-k, and so on. Clients associated with a particular ISP may be behind one or more firewalls. Each ISP may provide a firewall or the like to prevent unwanted direct connection to its clients. In addition, clients (or the LANs or WANs on which they operate and by which they connect to their ISP) may themselves provide one or more firewalls to prevent unwanted outside connections. Thus, for example, client 108-1-1, associated with ISP-1, may be separated from the network(s) 110 and thus the CDN components (e.g., server(s) 106) by one or more firewalls (although only two firewalls are shown in the drawing, others may be in use).

Thus, in many cases, the netd agent mechanisms 208 can only collect connectivity information relative to the ISPs' resolvers (which are not behind firewalls), and not to the clients themselves or to components behind the firewall(s). In some cases the ISPs resolvers may also not be reachable (e.g., pingable) by CDN components, in which case the netd 208 mechanisms may try to reach something known to be close.

Measurements for Non-Reachable Network Components

Approaches to deal with non-reachable (e.g., non-pingable) components behind one or more firewalls are described here.

Figure 3:
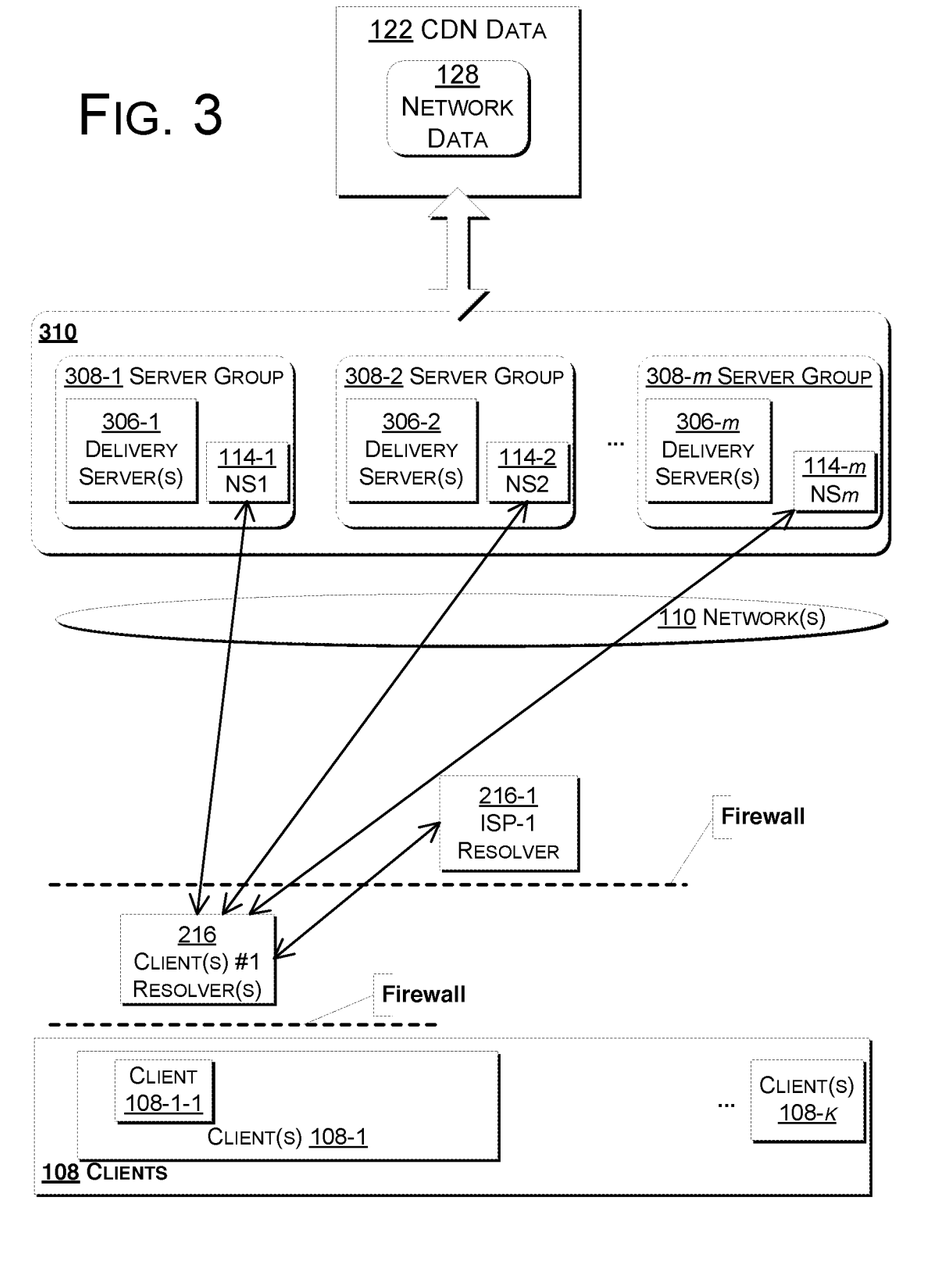

With reference to FIG. 3, name servers are located (or co-located) with groups of delivery servers 106 associated, e.g., with gateways or the like. The name servers are preferably situated such that the network cost from a client's resolver to the name server associated with a group is substantially the same as the network cost from that client's resolver to a server 106 in the group. Thus, the name server(s) associated with a particular server group are considered measurement equivalent to the servers in that particular server group. For example, with reference to FIG. 3, the servers 106 are grouped into m server groups 308-1, 308-2 . . . 308-*m*, with the servers in each server group 308-*j* being, e.g., at or associated with the same gateway (not shown). A name server NSj is associated with the j-th server group 308-*j*. So, e.g., name server NS1 114-1 is associated with the server group 308-1, name server NS2 114-2 is associated with the server group 308-2, and so on.

For each of the j server groups, and for each client resolver, the network cost from the client resolver to a name server NSj in the server group j may be considered a substantial approximation of the network cost from that client resolver to servers in the server group j.

For a content provider 102 to use the CDN, the DNS is configured so that requests for that content provider's content (property) that is to be handled by the CDN will be resolved, at least in part, by the CDN's rendezvous system 112. This effect may be achieved using a CNAME or the like. For example, a content provider ("CP") may have certain properties (e.g., at "www.CP.com") served by the CDN. The content provider may use the CNAME CP.fp.net so that requests to resolve www.CP.com resolve to CP.fp.net, where "CP.fp.net" is resolved by a CDN name server 114.

Thus, when a client 108 tries to resolve the hostname or domain in a URL for a resource being handled by the CDN, the client's resolver will be directed, e.g., because of a CNAME, to a CDN name server 114 or resolver. When a client's resolver (or the ISP's resolver) goes through the DNS identification process (to be told where the CDN name servers are—i.e., to be given a network address of the CDN name servers), the client's resolver typically gets back a list of name servers (and associated IP addresses) in the CDN that can be used to resolve the hostname/domain from the URL.

For example, for the name "CP.fp.net," the client resolver 216 may receive the list of name servers and corresponding IP addresses:

ns1.fp.net IP1 ns2.fp.net IP2

...

ns9.fp.net IP9

Each of these IP addresses corresponds to a CDN name server that can resolve the hostname/domain from the URL. In this example nine name servers were provided in the list, though it should be appreciated that this is merely an example, and different numbers of name servers may be used. The name servers (and the corresponding IP addresses) may correspond to some of the various name servers NSj associated with the j server groups (308, FIG. 3).

Having received a list of name servers and addresses, the client resolver or ISP resolver then uses one of these addresses to continue to resolve the name.

The resolver preferably includes a mechanism implementing a so-called Least Latent Algorithm that, over time, picks a best or optimal name server from the list to resolve names. The Least Latent Algorithm operates as follows: the first time a name is resolved, the resolver randomly picks one of the name servers in the list and issues a request to that name server. The resolver then records how long it took to get back an answer from the selected name server. The next time the resolver has to resolve that name it picks another of the name servers in the list and tracks the time to get a name resolution. This process is repeated each time the resolver tries to resolve that name. For a popular name, the resolver will eventually go through all name servers in the list, using each of them once. A Time To Live (TTL) field is associated with each resource record and controls the length of time for which a record may be retained in the cache of a caching name server. The resolver has to use a fixed TTL (time-to-live) for all of records that it receives from the name servers (e.g., TTL=230 seconds).

As clients ask this resolver to resolve a name, the resolver will cache the answer for TTL (e.g., 230 seconds) and then ask again if the cached result is stale. The resolver gathers the timing measurements for each of the name servers that it has been given and gives each of them a weighting. Each time the client resolver gets an answer from a name server it adds a weight number to that name server. If one name server is considerably closer (by some measure of network closeness, e.g., gives the quickest response time) then that name will be used more frequently by the client resolver.

Each client resolver eventually determines which name server 114-*j* is "best" for that resolver. (Even if it has a current "best" name server, the resolver should routinely re-check the other name servers in case one of them improves or becomes the "best.") If the j-th name server is "best" for a particular client resolver, then it is assumed that the delivery servers 306-*j* in the j-th server group are "best" for clients 108 associated with that client resolver. If the "best" name server for a particular client resolver changes, then the "best" server group for that client resolver will also change.

Each name server 114-*j* can determine if it was best for a particular resolver (or client) based on the frequency of name resolution requests it receives from that resolver (or client). If there are k IP addresses in the list returned by the resolver (in response to the request to resolve the hostname/domain in the URL), and if each IP address in the list has the same TTL, then each name server (in each server group) should get a resolution request, on average, once every k*TTL seconds (assuming that the TTL is honored by the resolvers). That is, each name server should get one request for every k requests. If a name server determines that it is getting more (or substantially more) than one in every k requests (e.g., it is getting a request every TTL) from a particular resolver, then that name server can assume that it is the most popular name server for that particular resolver. A name server becomes the most popular for a particular resolver if that name server is "best" or "optimal" for that resolver (based on the resolver's implementation of the Least Latent Algorithm) The name server can identify the resolver based on the address provided by the resolver with each resolution request.

Having determined that it is the "best" or "optimal" name server for a particular resolver, a name server can provide that information as network data 128 to be used by map builder 126 for subsequent network map building.

In addition (or instead), having determined that it is the "best" or "optimal" name server for a particular resolver, a name server may respond directly with its location or with the location (e.g. a network address) of a server at its location. For the purposes of this response, the name server's location is considered to be the same as that of other servers in its server group.

The determination by a name server that it is the most popular (i.e., the least latent) for a particular resolver may also be used to confirm or validate other information about that resolver, especially when the resolver is not reachable and the other information is based on estimates.

Information provided as network data 128 by the name servers 114-*k* in the various server groups 308-*k*, may be used by the map builder 126 to build or augment the network map 124. It should be appreciated that the information provided as network data 128 by the name servers 114-*k* in the various server groups 308-*k* includes connectivity information for components (e.g., client resolvers 216) that are behind one or more firewalls. The firewall(s) may prevent incoming connections to the client resolvers, thereby preventing the various netd agent mechanisms 208 from connecting to (e.g., pinging) the client resolvers 216 (and possibly the ISP resolvers). However, since the client resolvers (and ISP resolvers) can make outbound connections to the name servers 114, the results of measurements made from behind the firewall(s) can be used to build or augment the network map 124. Those of ordinary skill in the art will realize and appreciate, upon reading this description, that an "optimal" or "best" name server 114-*k* for a particular resolver will not know what measurements (e.g., latency measurements) the resolver actually obtained for that name server; it will only be able to determine that it was selected as the "optimal" or "best" name server 114-*k* for that particular resolver.

For a particular resolver behind a firewall, it is not possible to measure latency (using "ping" and the like) from a server group to that resolver. The resolver's own latency measurements to the various name servers associated with the various server groups may therefore be considered to be a proxy measurement, selecting a "best" or "optimal" name server, thereby implying that the latency from the "best" or "optimal" name server to the particular resolver is the lowest among all of the name servers associated with the server group. Since the name server associated with a server group is measurement-equivalent to the servers in the server group, that server group is "best" or "optimal" for that particular resolver (and therefore for clients associated with that particular resolver).

Additional/Alternative Approach

In another approach (that may be used alone and/or in combination with the above approaches), certain CDN name servers 114 are configured to sometimes respond to some requests with a CNAME instead of an address record. The CNAME is constructed at the time of and in response to the request, and is formed so that an attempt to resolve the CNAME will come back to the name server that generated the CNAME. That name server can then determine the time it took from when it provided the CNAME to a resolver until the CNAME request came back from that resolver, and use that time as a proxy or equivalent of the latency between the name server and the resolver. That latency-equivalent information can be provided by the name server as network data 128 to be used to generate the network map 124.

As an example, with reference again to FIG. 3, in response to a request from a particular client resolver 216 to a particular name server 114 to resolve a particular domain name (e.g., "www.cp.com", which is converted into a CNAME at the customer domain to "cp.fp.net"), the particular name server generates a CNAME (e.g., "cp.fp.net.tq.<<timestamp>>.c.fp.net"). The <<timestamp>> field in the CNAME is the time at which the CNAME was created; the ".tq." field signals the name servers 114 that this CNAME, when received, requires additional processing. The CNAME may also include an identification of the requesting resolver.

To force the request back to the name server that issued the CNAME, each name server may be given its own unique domain that can be included in the CNAME. If the request goes to a different name server (than the CNAME issuer), then the timestamp in the CNAME can be used to determine a latency, but that corresponds to an outbound latency from the first name server to the resolver and a second latency from the resolver back to the second name server. This process, where the CNAME is issued by one CDN name server, and the resolution of the CNAME is handled by a second CDN name server, assumes that the CDN name servers' clocks are synchronized.

When the CNAME is returned to the requesting resolver 216, that resolver will try to resolve that name, preferably by going back to the particular CDN name server 114 that generated and issued the CNAME. That CDN name server will then respond with an appropriate network address for the requesting resolver. In addition, that CDN name server can determine a round-trip time to the resolver, and that information may be provided as network data 128. Here, again, even though the name server may be unable to "ping" or otherwise connect to the requesting resolver (e.g., because the resolver may be behind one or more firewalls), the CDN name server can determine a round trip time to the resolver. Since the resolver must do additional processing before it tries to resolve the CNAME, the round trip time is probably greater than a "ping" would take, but it still provides a measurement that can be used, alone or with other data, to determine a network map. Furthermore, the latency associated with a CNAME (from issue to return) may be comparable to the latency associated with other CNAMEs from other resolvers and to other name servers.

Since these CNAME responses add time to the actual processing of a request, they should not be made too often. For example, they can be used 1 in 1,000, or 1 in 10,000 or 1 in 100,000 requests without impacting client experiences. As an alternative, the CNAMEs (per resolver) can be done per time period (e.g., once per hour).

The system may use a list to determine which machines should be pinged. For example, as noted, the controller 130 may use a list (e.g., a ping target list) to instruct the netd agent mechanisms 208 which targets to measure ("ping"). This list may be made available to the name servers to augment their operation. For example, the CNAME modification process may be used only for unreachable (e.g., non-pingable) machines, or it may be used to confirm ping results for reachable machines.

Computing

The services, mechanisms, operations and acts shown and described above are implemented, at least in part, by software running on one or more computers of CDN 100.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 4:
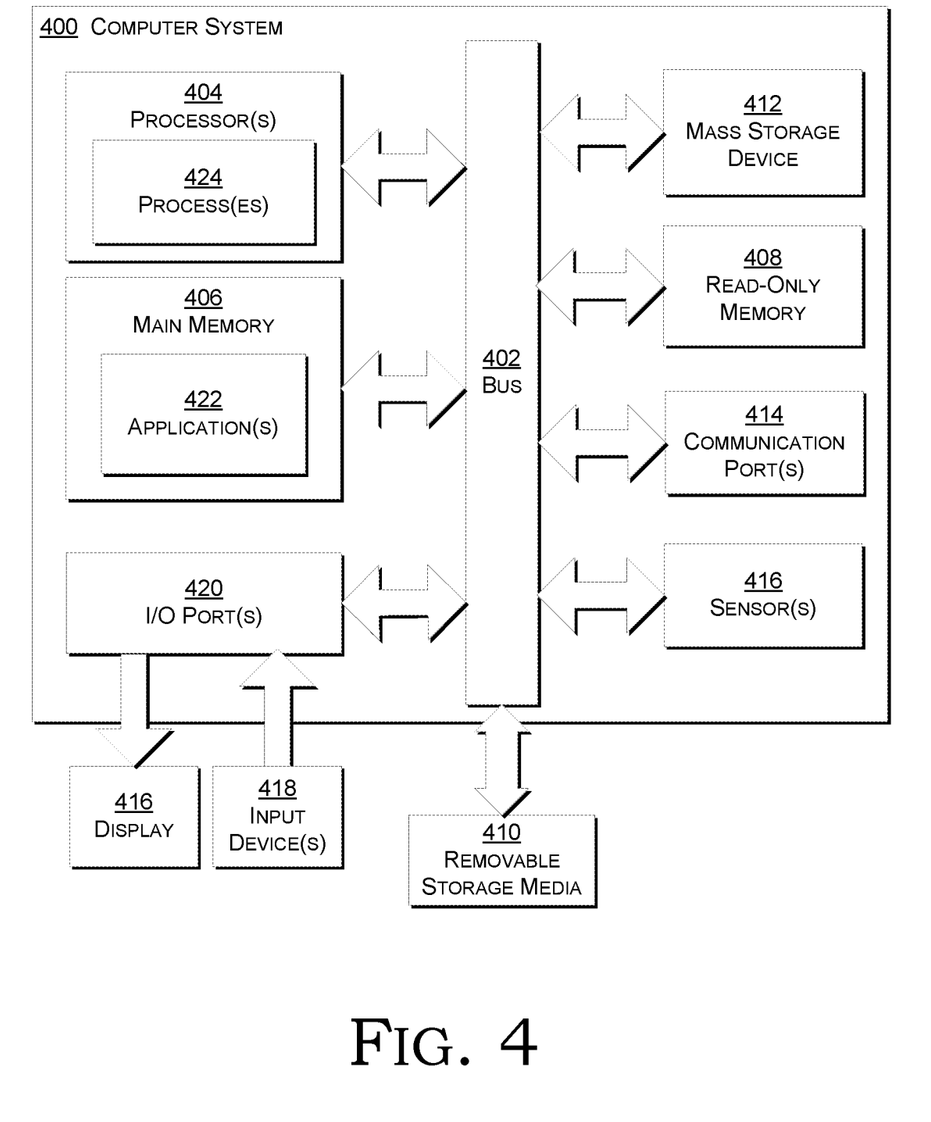
FIG. 4 depicts aspects of computing according to exemplary embodiments hereof.

FIG. 4 is a schematic diagram of a computer system 400 upon which embodiments of the present disclosure may be implemented and carried out.

According to the present example, the computer system 400 includes a bus 402 (i.e., interconnect), one or more processors 404, a main memory 406, removable storage media 410, read-only memory 408, mass storage 412, and one or more communications ports 414. Communication port 414 may be connected to one or more networks by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be any known processor, such as, but not limited to, an Intel® Itanium® or Itanium 2® processor(s), AMD® Opteron® or Athlon MP® processor(s), or Motorola® lines of processors, and the like. Communications port(s) 414 can be any of an RS-232 port for use with a modem based dial-up connection, a 10/100 Ethernet port, a Gigabit port using copper or fiber, or a USB port, and the like. Communications port(s) 414 may be chosen depending on a network such as a Local Area Network (LAN), a Wide Area Network (WAN), a CDN, or any network to which the computer system 400 connects. The computer system 400 may be in communication with peripheral devices (e.g., display screen 416, input device(s) 418) via Input/Output (I/O) port 420.

Main memory 406 can be Random Access Memory (RAM), or any other dynamic storage device(s) commonly known in the art. Read-only memory 408 can be any static storage device(s) such as Programmable Read-Only Memory (PROM) chips for storing static information such as instructions for processor 404. Mass storage 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 402 communicatively couples processor(s) 404 with the other memory, storage, and communications blocks. Bus 402 can be a PCI/PCI-X, SCSI, a Universal Serial Bus (USB) based system bus (or other) depending on the storage devices used, and the like. Removable storage media 410 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 406 is encoded with application(s) 422 that supports the functionality as discussed herein (the application 422 may be an application that provides some or all of the functionality of the CD services described herein). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406 via the use of bus 402 in order to launch, run, execute, interpret or otherwise perform the logic instructions of the application(s) 422. Execution of application(s) 422 produces processing functionality of the service related to the application(s). In other words, the process(es) 424 represent one or more portions of the application(s) 422 performing within or upon the processor(s) 404 in the computer system 400.

It should be noted that, in addition to the process(es) 424 that carries (carry) out operations as discussed herein, other embodiments herein include the application 422 itself (i.e., the un-executed or non-performing logic instructions and/or data). The application 422 may be stored on a computer readable medium (e.g., a repository) such as a disk or in an optical medium. According to other embodiments, the application 422 can also be stored in a memory type system such as in firmware, read only memory (ROM), or, as in this example, as executable code within the main memory 406 (e.g., within Random Access Memory or RAM). For example, application 422 may also be stored in removable storage media 410, read-only memory 408 and/or mass storage device 412.

Those skilled in the art will understand that the computer system 400 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method in a content delivery network (CDN), wherein said CDN comprises a plurality of delivery servers, and wherein said CDN delivers content on behalf of at least one content provider, the computer-implemented method comprising:

logically grouping distinct delivery servers of said plurality of delivery servers into delivery server groups, and associating one or more CDN name servers with at least some of said delivery server groups;

determining, by a particular CDN name server of said one or more CDN name servers, an estimated popularity of the particular CDN name server for a particular resolver;

determining, based on the estimated popularity, network data with respect to the particular CDN name server relative to the particular resolver;

determining network map data using at least the network data from the particular CDN name server;

in response to a client request, said request comprising a hostname associated with a content provider, at least one CDN name server of the one or more CDN name servers determining at least one delivery server of the plurality of delivery servers to process said client request, wherein said determining uses said network map data; and providing said client with information about said at least one delivery server to process said client request.

2. The computer-implemented method of claim 1 further comprising:

updating said network map based on changes in said network data.

3. The computer-implemented method of claim 1 wherein said network data are also generated from monitoring agents located around the network.

4. The computer-implemented method of claim 1 wherein said particular resolver is separated from said one or more CDN name servers by a firewall that prevents unsolicited inbound connections from said CDN name servers to said particular resolver.

5. The computer-implemented method of claim 1 wherein said estimated popularity of said particular CDN name server for said particular resolver is based on one or more attempts by said resolver to resolve a particular hostname associated with a content provider.

6. The computer-implemented method of claim 5 wherein said estimated popularity of said particular CDN name server is determined by said particular CDN name server based on a time-to-live (TTL) value associated with said particular hostname in a domain name system (DNS) record for said particular hostname.

7. The computer-implemented method of claim 6, wherein said particular CDN name server determines its estimated popularity based on a number of name resolution requests said particular CDN name server receives from said particular resolver, as a function of said TTL.

8. The computer-implemented method of claim 1 wherein said grouping of said distinct delivery servers is based on a physical location of said delivery servers.

9. The computer-implemented method of claim 8 wherein said associating of said one or more CDN name servers is based on said physical location of said delivery servers.

10. The computer-implemented method of claim 9 wherein said one or more CDN name servers are co-located with corresponding physically co-located delivery servers.

11. The computer-implemented method of claim 10 wherein said physically co-located delivery servers comprise a cluster.

12. The computer-implemented method of claim 1 wherein said client request is made via a given resolver, and wherein, when said at least one CDN name server that determines that it is popular with respect to said given resolver, said at least one CDN name server provides said client with information about a cluster of co-located delivery servers.

13. A system for providing a delivery server in a content delivery network (CDN), wherein said CDN comprises a plurality of delivery servers, and wherein said CDN delivers content on behalf of at least one content provider, the system comprising:

at least one processor;

memory, operatively connected to the at least one processor and containing instructions that, when executed, causes the system to perform a method, the method comprising:

logically grouping distinct delivery servers of said plurality of delivery servers into delivery server groups, and associating one or more CDN name servers with at least some of said delivery server groups;

determining, by a particular CDN name server of said one or more CDN name servers, an estimated popularity of the particular CDN name server for a particular resolver;

determining, based on the estimated popularity, network data with respect to the particular CDN name server relative to the particular resolver;

determining network map data using at least the network data from the particular CDN name server;

in response to a client request, said request comprising a hostname associated with a content provider, at least one CDN name server of the one or more CDN name servers determining at least one delivery server of the plurality of delivery servers to process said client request, wherein said determining uses said network map data; and providing said client with information about said at least one delivery server to process said client request.

14. The system of claim 13, wherein said estimated popularity of said particular CDN name server is determined by said particular CDN name server based on a time-to-live (TTL) value associated with said particular hostname in a domain name system (DNS) record for said particular hostname.

15. The system of claim 14, wherein said particular CDN name server determines its estimated popularity based on a number of name resolution requests said particular CDN name server receives from said particular resolver, as a function of said TTL.

16. A computer-implemented method in a content delivery network (CDN), wherein said CDN comprises a plurality of delivery servers, and wherein said CDN delivers content on behalf of at least one content provider, the computer-implemented method comprising:

logically grouping distinct delivery servers of said plurality of delivery servers into delivery server groups, and associating one or more CDN name servers with at least some of said delivery server groups;

determining, by a particular CDN name server of said one or more CDN name servers, an estimated popularity of the particular CDN name server for a particular resolver, wherein said estimated popularity of said particular CDN name server is determined by said particular CDN name server based on a time-to-live (TTL) value associated with said particular hostname in a domain name system (DNS) record for said particular hostname;

determining, based on the estimated popularity, network data with respect to the particular CDN name server relative to the particular resolver;

determining network map data using at least the network data from the particular CDN name server;

in response to a client request, said request comprising a hostname associated with a content provider, at least one CDN name server of the one or more CDN name servers determining at least one delivery server of the plurality of delivery servers to process said client request, wherein said determining uses said network map data; and providing said client with information about said at least one delivery server to process said client request.

* * * * *